United States Patent Office 2,748,011
Patented May 29, 1956

2,748,011

COMPOSITION AND METHOD FOR EXTENDING DRYING OILS

Marion W. Pickell, Oklahoma City, Okla., assignor to Kerr-McGee Oil Industries, Inc., a corporation of Delaware No Drawing. Application April 14, 1953,
Serial No. 348,820

3 Claims. (Cl. 106—246)

This invention relates to new and useful compositions primarily intended for use in the paint, varnish and enamel industries and in addition relates to a method for extending the drying oil content of such compositions. More specifically, the compositions of the present invention are primarily intended as replacement materials for drying oils.

The term "drying oil" includes any liquid oily material of an organic nature which, when applied as a thin film, will readily absorb oxygen from the air and dry or harden to a relatively tough, elastic substance upon exposure to normal atmospheric conditions, either with or without the addition of driers. Drying oils are usually derived from natural sources such as vegetable or marine animal matter, but may also be obtained by synthetic processes. Thus, this term includes such materials as linseed oil, heat bodied linseed oil, tung oil, soya bean oil, perilla oil, oiticica oil, dehydrated castor oil, sunflower seed oil, and fish oils.

There are a number of compositions which are used as extenders in the paint, varnish and enamel industries. These materials are primarily cost-reducing materials but do have secondary functions which vary in accordance with the type of coating composition in which they are used. Examples of such extenders include silica, china clay, barium sulfate and calcium carbonate. Some of the properties of paint which are influenced by such extenders include consistency, drying rate, gloss, color, hiding ability, weather resistance, adhesion to various surfaces, and corrosion resistance.

None of these materials, however, are actually used in place of at least a portion of the drying oil content of a paint, varnish or enamel. Thus, the cost of such formulations, insofar as the drying oil content thereof is concerned, is not reduced by their use. In addition, although cost plays an important factor in commercial production, an equally important factor is the quality of the coating composition obtained if a portion or all of the drying oil content thereof is replaced by a substitute material. Any such substitute, in order to be of value, must not appreciably reduce the quality of the product and should, if possible, improve its properties.

Accordingly, it is a principal object of the present invention to provide a composition which is suitable for use as a replacement material for drying oils in paint, varnish and enamel compositions.

It is a further important object of the present invention to provide a composition suitable for use as a replacement material for drying oils in paint, varnish and enamel compositions, which will lower the cost of the composition without altering the desirable properties of the resulting composition.

Another object of the present invention is to provide a replacement material for the drying oils of paints, varnishes and enamels which will improve certain properties of the resulting coating composition.

A further important object of the present invention is to provide a method of extending the drying oil content of a paint, varnish or enamel composition.

These and other objects of the present invention will become more apparent from the following description of my invention.

I have discovered that a mixture of resins and oils obtained from an asphalt-type bituminous material provides a highly satisfactory extender for the drying oil content of a paint, varnish or enamel. Up to 60% by weight of the normal drying oil content of a paint, varnish or enamel may be replaced by the resin-oil mixture. Replacement of at least 20% by weight of the drying oil content and not more than 60% by weight provides coating compositions certain of whose properties are improved as compared with the properties of standard formulations. The compositions of the present invention which are used as replacement materials for drying oils therefore comprise a mixture or blend of drying oil and a resin-oil fraction of an asphalt type bituminous material.

The reason the entire drying oil content of a given paint, varnish or enamel cannot be replaced by the resin-oil fraction obtained from a bituminous material is that the resin-oil fraction alone, because of the high resin content thereof, tends to cause a brittle film surface and film checking results, particularly if the composition is dried quickly by sunshine or artificial heat. The addition of a flexible drying oil in the correct proportions overcomes this brittle surface drying and prevents checking of the film. The upper limit, i. e., 60% resin-oil mixture in the compositions of the present invention has been determined by exposure fence data and represents the maximum amount which can be used in the compositions of the present invention without the occurrence of these undesired results. The lower limit, i. e., 20% represents that limit below which certain improved properties resulting from the use of the compositions of the present invention in place of the conventional drying oil used in paints, varnishes and enamels are not obtained. It will thus be appreciated that less than 20% by weight of the resin-oil fraction may be used in the compositions of the present invention if these improved properties are not necessary because of the particular application to which the resultant formulation is applied and if the economical consideration involved when using as much resin-oil mixture as possible is disregarded.

One outstanding advantage of the resin-oil and drying oil composition of the present invention in place of a 100% drying oil in a paint, varnish or enamel is that the resin-oil and drying oil blend has much more resistance to chemical materials, especially to free alkali as found in masonry materials such as concrete blocks, stucco, etc. Another advantage is that when using the compositions of the present invention in place of the conventional drying oil, the resultant products possess increased gloss for the same pigmentation. In addition, paints, varnishes and enamels containing the compositions of the present invention instead of 100% drying oil have increased water resistance.

The resin-oil fraction used as a constituent of the composition of the present invention may be obtained from bituminous materials such as steam or vacuum-reduced residues, cracking residues, oxidized (air-blown) asphalts, catalytically oxidized (air-blown) asphalts, native (e. g. Trinidad) asphalts, crude oil containing asphalts, reduced crude oil containing asphalts, as well as naturally occurring coal tars and pitches resulting from the destructive distillation of peat, lignite, shales, wood and other organic matter. Resin-oil fractions may be obtained from these materials by the use of selective solvents. For example, when asphalt is thoroughly mixed with normal pentane, isopentane, normal hexane, petroleum ether and certain other solvents, the undissolved portion settling out is classified as asphaltenes and the soluble portion as a mixture of resinous and oil materials. Paraffinic hydrocarbons containing from 3 to 8 carbon atoms or mixtures thereof are the most suitable solvents for separating asphaltenes from these bituminous materials.

The minimum volume of solvent that should be utilized for obtaining the resin-oil fraction is about 3 volumes of solvent to 1 volume of bituminous material. The higher the solvent to bituminous material ratio is, the more thorough the separation of asphaltenes. Consequently, the maximum amount of solvent utilized is dependent upon economic practicalities. A preferred volume ratio of solvent to bituminous material is 10:1. A preferred solvent is pentane.

Separation from the asphaltenes which settle out upon the use of these selective solvents may be obtained by conventional means such as decantation, filtration, centrifuging, etc. The oil and resin fraction is obtained from solution by distillation of the solvent therefrom.

It is to be understood that when the compositions of the present invention are substituted for the normal drying oil content of a paint, varnish or enamel, the other constituents of such compositions may be used in the same proportions as present in a standard paint, varnish or enamel formulation. Thus, conventional driers are used in the proportions normally employed for 100% drying oil content formulations as are pigments, mineral spirits or other solvent vehicles, etc.

The only real limitation that the composition of the present invention has, as compared with the 100% drying oil content formulation, is that the resultant paint, varnish or enamel is darker in color in view of the relatively dark color of a resin-oil fraction of a bituminous material. Therefore, when extremely light-colored paints, varnishes and enamels are desired, the compositions of the present invention are not particularly suitable. White paints, light pastel shades, etc. are not obtainable when using the compositions of the present invention.

The following examples are for the purpose of illustration and are not limiting to the scope of the present invention which is set forth in the appended claims.

*Example I*

The following formulations were prepared for the purpose of studying drying time and brittleness of dried film of the compositions of the present invention with a 100% drying oil formulation.

*Formula A*

| | Percent |
|---|---|
| Resin-oil fraction | 60 |
| Mineral spirits | 40 |
| | 100 |

*Formula B*

| | Percent |
|---|---|
| Resin-oil fraction | 40 |
| Linseed oil—$Z_3$ | 20 |
| Mineral spirits | 40 |
| | 100 |

*Formula C*

| | Percent |
|---|---|
| Resin-oil fraction | 20 |
| Linseed oil—$Z_3$ | 40 |
| Mineral spirits | 40 |
| | 100 |

*Formula D*

| | Percent |
|---|---|
| Linseed oil—$Z_3$ | 60 |
| Mineral spirits | 40 |
| | 100 |

Naphthenate driers were added to the above compositions as follows (in amounts based on per cent metal to non-volatile in formula): Co=0.08%; Mn=0.1%; and Pb=0.6%.

A thin film of each of these formulations was coated on a metal testing strip. The results of the drying time and brittleness tests are tabulated as follows:

| | Dry time (Hours) | | (4 weeks) (indoors) Brittleness |
|---|---|---|---|
| | Dust Free | Tack Free | |
| Formula A | 3–4 | 18–20 | present. |
| Formula B | 4–5 | 20–24 | absent. |
| Formula C | 5–6 | 20–24 | Do. |
| Formula D | 5–6 | 20–24 | Do. |

*Example II*

The following paint was made using conventional paint industry manufacturing procedure.

| | Percent |
|---|---|
| Red iron oxide (95% $Fe_2O_3$) | 15.2 |
| Talc extender | 15.2 |
| Aluminum stearate suspending agent | 0.4 |
| Resin-oil fraction | 22.8 |
| Kettle bodied linseed oil—$Z_3$ | 18.5 |
| Mineral spirits | 25.5 |
| Lead naphthenate (24% Pb) | 0.9 |
| Cobalt naphthenate (6% Co) | 0.5 |
| Manganese naphthenate (6% Mn) | 0.5 |
| Calcium naphthenate (4% Ca) | 0.5 |
| | 100.0 |

This paint when compared with an identical formulation having 41.3% kettle bodied linseed oil in place of the resin-oil and kettle bodied linseed oil content as expressed above was equally good in so far as drying time, brittleness, consistency and texture are concerned. It possessed a higher gloss than the standard formulation and was more resistant to free alkali when applied on a masonry concrete block wall.

*Example III*

The following paint was made using conventional paint industry manufacturing procedure.

| | Percent |
|---|---|
| Chrome oxide green | 25.3 |
| Talc extender | 5.1 |
| Aluminum stearate suspending agent | 0.4 |
| Resin-oil fraction | 22.8 |
| Kettle bodied linseed oil—$Z_3$ | 18.5 |
| Mineral spirits | 25.5 |
| Lead naphthenate (24% Pb) | 0.9 |
| Cobalt naphthenate (6% Co) | 0.5 |
| Manganese naphthenate (6% Mn) | 0.5 |
| Calcium naphthenate (4% Ca) | 0.5 |
| | 100.0 |

This paint when compared with an identical formulation having 41.3% kettle bodied linseed oil in place of the resin-oil and kettle bodied linseed oil content as expressed above was equally good in so far as drying time, brittleness, consistency and texture are concerned. It possessed a higher gloss than the standard formulation and was more resistant to free alkali when applied on a masonry concrete block wall.

I claim.

1. A composition comprising a fatty drying oil and from 20 to 60 percent by weight of an essentially asphaltene-free resin-oil fraction of a bituminous material.

2. A replacement material for the drying oil content of a paint, varnish or enamel comprising a fatty drying oil and from 20 to 60 percent by weight of an essentially asphaltene-free resin-oil fraction of a bituminous material.

3. A method of extending the drying oil content of a paint, varnish or enamel which comprises replacing from 20 to 60 percent by weight of the fatty drying oil content thereof with an essentially asphaltene-free resin-oil fraction of a bituminous material.

References Cited in the file of this patent

UNITED STATES PATENTS

| | | |
|---|---|---|
| 1,982,231 | Parrett | Nov. 27, 1934 |
| 2,031,944 | Frolich | Feb. 25, 1936 |
| 2,078,921 | Alvarado | May 4, 1937 |
| 2,354,554 | Showalter | July 25, 1944 |
| 2,366,657 | Sorem | Jan. 2, 1945 |